L. LITCHFIELD.
Horse Hay-Rakes.

No. 148,966.

Patented March 24, 1874.

Witnesses:

Inventor:
Lyman Litchfield
Per
Attorneys.

UNITED STATES PATENT OFFICE.

LYMAN LITCHFIELD, OF GOUVERNEUR, NEW YORK.

IMPROVEMENT IN HORSE HAY-RAKES.

Specification forming part of Letters Patent No. 148,966, dated March 24, 1874; application filed August 5, 1873.

*To all whom it may concern:*

Be it known that I, LYMAN LITCHFIELD, of Gouverneur, in the county of St. Lawrence and State of New York, have invented a new and Improved Horse Hay-Rake; and I do hereby declare that the following is a full, clear, and exact description of the same, reference being had to the accompanying drawing forming a part of this specification.

The invention consists in the improvement of horse-rakes, as hereinafter described and pointed out in the claim.

Figure 1:
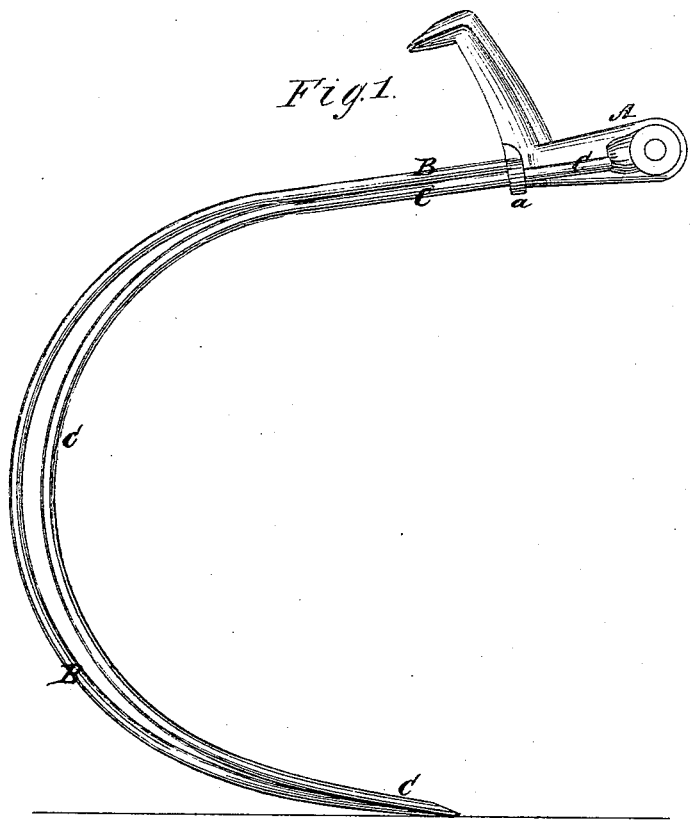
Figure 2:
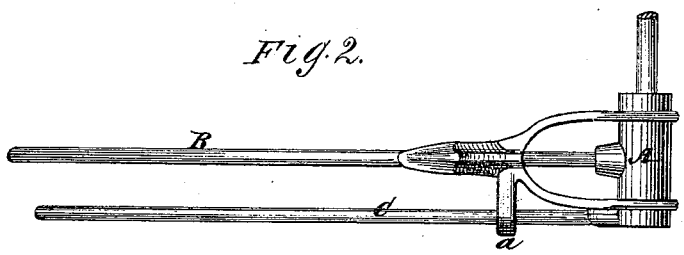

Figure 1 is a side elevation, and Fig. 2 a top view.

In the drawing, A represents the spool with a receiving socket and bracket for a tooth, B, and an auxiliary socket and bracket, a, for the end-guard tooth C, which is placed more or less in advance of tooth B.

Having thus described my invention, what I claim as new, and desire to secure by Letters Patent, is—

The spool A, constructed as described, having a receiving socket and bracket for tooth B, and an auxiliary socket and bracket, a, for attaching the end-guard tooth C, as and for the purpose described.

LYMAN LITCHFIELD.

Witnesses:
GEO. PARKER,
ALDEN GIFFORD.